(12) United States Patent
Auslander et al.

(10) Patent No.: US 7,422,158 B2
(45) Date of Patent: ***Sep. 9, 2008

(54) FLUORESCENT HIDDEN INDICIUM

(75) Inventors: Judith D. Auslander, Westport, CT (US); Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 555 days.

This patent is subject to a terminal disclaimer.

(21) Appl. No.: 10/692,569

(22) Filed: Oct. 24, 2003

(65) Prior Publication Data

US 2005/0087605 A1    Apr. 28, 2005

(51) Int. Cl.
*G06K 19/05*    (2006.01)
(52) U.S. Cl. ........................ 235/491; 235/494
(58) Field of Classification Search ............... 235/491, 235/494, 487, 469; 705/62, 60, 401
See application file for complete search history.

(56) References Cited

U.S. PATENT DOCUMENTS

| | | | | |
|---|---|---|---|---|
| 4,864,618 A | * | 9/1989 | Wright et al. | 380/51 |
| 5,067,713 A | * | 11/1991 | Soules et al. | 273/149 P |
| 5,109,153 A | * | 4/1992 | Johnsen et al. | 235/468 |
| 5,291,002 A | * | 3/1994 | Agnew et al. | 235/375 |
| 5,414,449 A | * | 5/1995 | Buan et al. | 347/217 |
| 5,554,842 A | * | 9/1996 | Connell et al. | 235/491 |
| 5,569,317 A | * | 10/1996 | Sarada et al. | 524/111 |
| 5,861,618 A | * | 1/1999 | Berson | 235/468 |
| 5,912,682 A | * | 6/1999 | Parkos | 347/40 |
| 6,108,643 A | * | 8/2000 | Sansone | 705/62 |
| 2003/0028497 A1 | | 2/2003 | Leon | |

FOREIGN PATENT DOCUMENTS

| | | | |
|---|---|---|---|
| EP | 900830 A1 | * | 3/1999 |
| JP | 358049765 A | * | 3/1983 |
| WO | 02/50802 A2 | | 6/2002 |

* cited by examiner

*Primary Examiner*—Daniel St.Cyr
(74) *Attorney, Agent, or Firm*—Charles R. Malandra, Jr.; Angelo N. Chaclas

(57) ABSTRACT

A printed indicium including a first section and a second section. The first section includes a first ink having a first color under normal daylight. The second section includes a second different ink. The second ink includes a fluorescent ink which has a second color under normal daylight which is substantially the same as the first color. The fluorescent ink has a fluorescence when subjected to fluorescent-exciting radiation. The second section is imbedded with the first section such that the first and second sections are substantially visually indiscernible from each other in normal daylight.

13 Claims, 5 Drawing Sheets

FIG.3
FIG.4
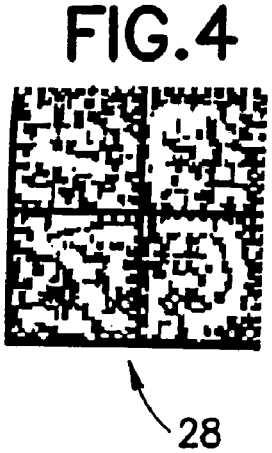
FIG.5
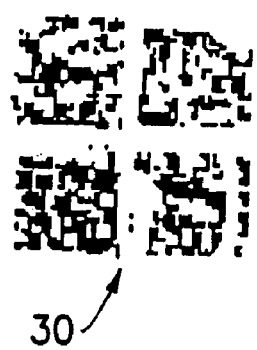
FIG.6
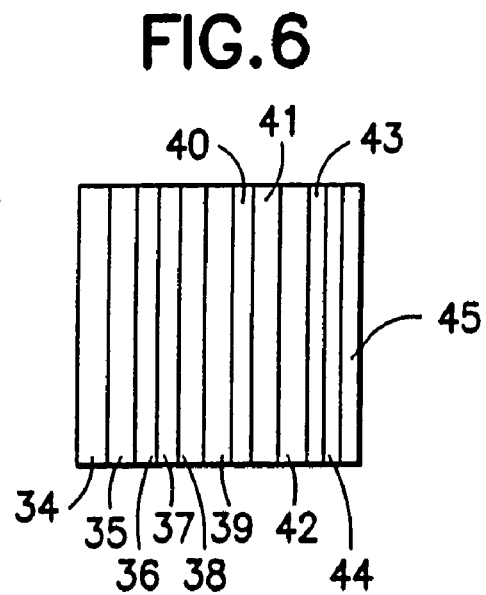

FLUORESCENT HIDDEN INDICIUM

BACKGROUND OF THE INVENTION

1. Field of the Invention

The present invention relates to printed indicia and, more particularly, to a hidden fluorescent indicium.

2. Brief Description of Prior Developments

In some applications, indicia such as one dimensional or two dimensional bar codes are printed on the items, such as mail pieces. For example, bar codes are often used on a mail piece such as with or in postage meter indicia. A black color is preferably used for printing two dimensional bar codes and is the preferred color for optimal contrast and readability. One problem with the printing of black two dimensional bar codes is that they can lead to easy duplication by available desktop printers or copiers. The black prints can easily be copied by any black-and-white copier or scanned and reprinted easily by available printers. Another problem is that everyone can see what is printed in the bar code. In some applications it is desirable to pass some information covertly. Dark color fluorescent inks are known such as described in U.S. patent application publication Nos. US 2002/0195586 A1, US 2003/0005303 A1, and US 2003/0041774 A1, which are hereby incorporated by reference in their entireties.

There is a desire to hide information in a printed indicium, but which can be relatively easily verified or read. There is a desire to provide hidden information which can be used to provide an additional level of security, such as with postage indicia.

SUMMARY OF THE INVENTION

In accordance with one aspect of the present invention, a printed indicium is provided including a first section and a second section. The first section includes a first ink having a first color under normal daylight. The second section includes a second different ink. The second ink includes a fluorescent ink which has a second color under normal daylight which is substantially the same as the first color. The fluorescent ink has a fluorescence when subjected to fluorescent-exciting radiation. The second section is imbedded with the first section such that the first and second sections are substantially visually indiscernible from each other in normal daylight.

In accordance with another aspect of the present invention, a system for printing indicia on an item is provided comprising a print head system and a controller. The print head system is adapted to print at least two different inks onto the item. The print head system comprising a first supply of a first ink having a first color under normal daylight and a second supply of a second different ink. The second different ink has a second color under a normal daylight which is substantially the same as the first color, and the second ink comprises a fluorescent ink. The controller is provided for controlling application of the first and second inks by the print head system on the item. The controller is adapted to print the first and second inks in at least partially intermixed patterns such that the patterns of the first and second inks are substantially visually indiscernible from each other in normal daylight, and the second pattern of the second ink is discernible from the first pattern when subjected to fluorescent-exciting radiation.

In accordance with one method of the present invention, a method of printing indicia on an item is provided comprising steps of printing a first pattern on the item with a first non-fluorescent ink, the first ink having a first color under normal daylight; and printing a second pattern on the item at the first pattern with a second different ink. The second different ink comprises a fluorescent ink having a substantially same color as the first ink under normal daylight. The first and second patterns are substantially visually indiscernible from each other under normal daylight. The second pattern is discernible from the first pattern when subjected to a fluorescent-exciting illumination source.

In accordance with another aspect of the present invention, a printed image is provided comprising a first section comprising a first ink; and a second section comprising a second different ink. The second ink comprises a fluorescent ink which has a fluorescence when subjected to fluorescent-exciting radiation. The first and second sections are intermixed with each other and printed in a photo mode of printing to form the printed image. The first and second sections are substantially visually indiscernible within the printed image.

In accordance with another aspect of the present invention, a printed indicium is provided comprising a first section comprising a first ink; and a second section comprising a second different ink. The second ink comprises a fluorescent ink which is substantially invisible or transparent in normal daylight.

BRIEF DESCRIPTION OF THE DRAWINGS

The foregoing aspects and other features of the present invention are explained in the following description, taken in connection with the accompanying drawings, wherein:

FIG. 3 is an enlarged view of the two dimensional bar code shown in FIG. 1;

FIG. 4 is a plan view of a first section of the two dimensional bar code shown in FIG. 3;

FIG. 5 is a plan view of a second section of the two dimensional bar code shown in FIG. 3;

FIG. 6 is a plan view of an alternate embodiment of a composite indicium incorporating features of the present invention;

DETAILED DESCRIPTION OF THE PREFERRED EMBODIMENTS

Figure 1:
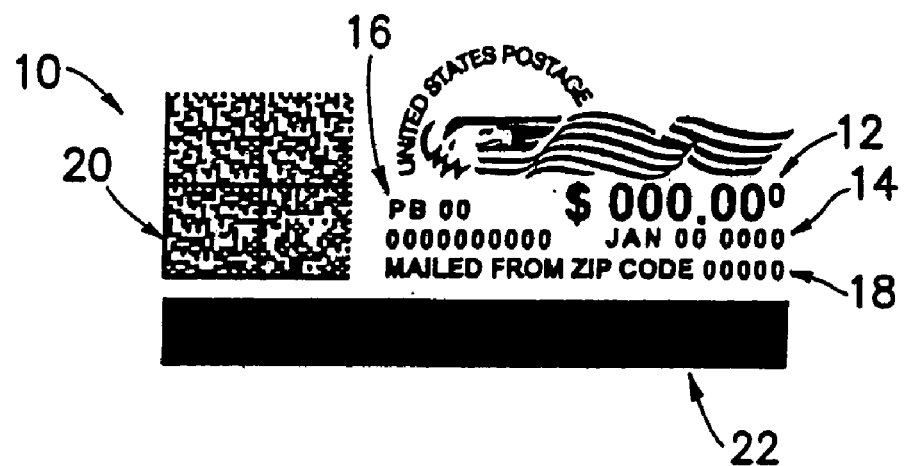
FIG. 1 is a plan view of a printed indicium incorporating features of the present invention.

Referring to FIG. 1, there is shown a plan view of a printed indicium 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

In the embodiment shown, the printed indicium 10 generally comprises a printed postage meter indicium. However, in alternate embodiments, features of the present invention could be used in any suitable type of printed indicium. For example, features of the present invention could be used with an indicium printed on a bank note, a tag, a ticket, a document, an identification card, or similar items. The indicium 10, in the embodiment shown, comprises many different types of communicated information. The indicium 10 includes a postage value section 12, a date section 14, a meter identification section 16, a zip code source identification section 18, a two dimensional bar code section 20, and a hidden message section 22. In alternate embodiments, the indicium 10 could comprise additional sections.

For an embodiment other than a postage meter indicium, the indicium could comprise any suitable type of message or information displaying/carrying sections. In the embodiment shown, the indicium 10 has a black color appearance in ambient normal daylight. As further explained below, the indicium 10 could be comprised of other colors. In one type of alternate embodiment, the indicium 10 could be comprised of multiple colors; one or more different colors at each of the different sections.

Figure 2:
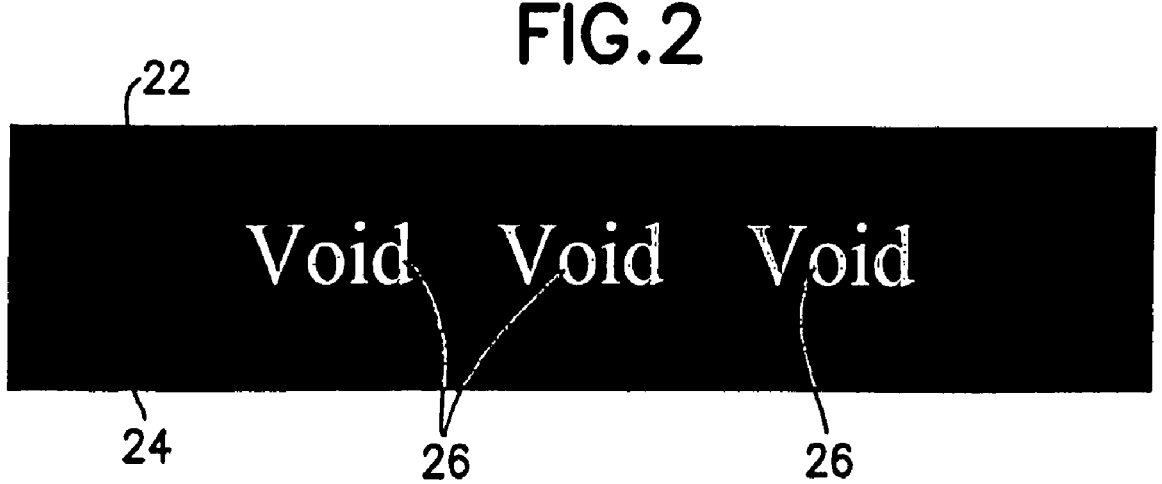
FIG. 2 is an enlarged view of a hidden message section of the printed indicium shown in FIG. 1 showing a hidden indicium which is exposed when subjected to fluorescent-exciting radiation.

The hidden message section 22 generally comprises a rectangular bar which is printed on an item, such as a mail piece. FIG. 1 shows the hidden message section as it would appear in ambient normal daylight. The hidden message section 22 has a general solid, substantially uniformly black shape and appearance. Referring also to FIG. 2, the hidden message section 22 is shown when it is subjected to fluorescent-exciting radiation. The hidden message section 22 generally comprises a first section 24 and one or more second sections 26.

The first section 24 is printed with a first ink having a first color under normal daylight. In the embodiment shown, the first color comprises the color black. The first ink comprises a non-fluorescent ink. The second sections 26 are printed with a second different ink having a second color under normal daylight. The second section 26 comprises a hidden indicium. In the embodiment shown, the second color is the same as the first color; namely, black. The second ink comprises a fluorescent ink. More specifically, the second ink comprises a black fluorescent ink such as disclosed in U.S. patent application publication Nos. US 2002/0195586 A1, US 2003/0005303 A1, and US 2003/0041774 A1. In alternate embodiments, any suitable type of color ink could be used for the first ink and any suitable color fluorescent ink could be used for the second ink, so long as the two colors are substantially the same.

Because the second ink has substantially the same color as the first ink under normal daylight, the second sections 26 are substantially visually indistinguishable from the first section 24 under normal daylight conditions. Only when the second sections 26 are subjected to fluorescent-exciting radiation do the second sections 26 become distinguishable from the first section 24. Thus, the information stored in the second sections 26 can remain hidden under normal daylight conditions, but can be displayed or read with the use of a relatively easy and inexpensive excitation radiation procedure.

In the embodiment shown, the second sections 26 comprise the word VOID. In alternate embodiments, the second sections could be comprised of any suitable alphanumeric characters, words or information. For example, the second section 26 could comprise the word ORIGINAL or could comprise the meter number rather than, or in addition to, printing the meter number at meter number section 16. As another example, the second section 26 could comprise machine readable information, such as a one dimensional or two dimensional bar code, or could comprise a fragile watermark.

In a preferred method of printing the hidden message section 22, the first section 24 is printed on the mail piece and the second section 26 is then subsequently printed on top of a portion of the first section 24. For example, the first and second sections could both be printed by a postage meter. As another example, the first section 24 could be printed by a postage meter and the second section 26 could be subsequently printed by a postal authority at the first section to indicate use of the postage and prevent further use of the postage. As another example, the first section 24 could be printed by a desktop printer and the second section 26 could be printed by the same desktop printer shortly thereafter, such as by a second pass of a print head. As another example, the second section 26 could be printed by a postage meter after the first section 24 was printed by the desktop printer; the postage meter reading a portion of the indicium 10 and generating or selecting information to be printed in the second section 26 based upon that reading.

Another method of printing the hidden message section 22 could comprise printing the first section 24, then subsequently printing the second section 26, but not printing the second section 26 on top of the first section 24. More specifically, when the first section 24 is printed, an open area can be left inside the first section 24. The second section 26 can be printed in this open area without having to be printed on the first section 24. In other alternate embodiments, the second sections 26 could be partially printed over portions of the first section 24, or the first and second sections could be a least partially interlaced or intermixed. Another method could comprise the second section 26 being printed first and the second section 24 being subsequently printed. If the printing device comprises multiple print heads, the first and second sections 24, 26 could be printed at substantially the same time.

The present invention solves a problem by imbedding images with colored fluorescent ink in text or bar codes printed with regular color ink. In a preferred embodiment, the colored fluorescent ink comprises a black fluorescent ink and the regular ink comprises non-fluorescent black ink. The inverse images created by reading the fluorescence can be easily made human legible by embedding simple messages such as VOID, PB METER NUMBER, ORIGINAL, etc. or symbologies such as one dimensional or two dimensional bar codes or fragile watermarks. The inverse images can be read with a modified scanner with an excitation ultraviolet lamp or be made human visually legible. This way, the color fluorescent ink is a security feature that carries covert information and can be easily verified with inexpensive means. The present invention can provide a solution for the need for hiding information which can be easy reading or verification at a later time.

The present invention can consist of providing information, which is normally subliminal or hidden, by embedding a fluorescent ink of the same color as the color of the ink in the main image. For example, the hidden information printed with the fluorescent ink could comprise a bar code or text. The dual characteristics of the fluorescent ink (color in ambient normal daylight and fluorescent when subjected to a radiation source) make the two inks readable and discernible from each other under the fluorescent exciting radiation (such as ultraviolet light or infrared radiation), but not visually discernible under ambient normal daylight. The images can be printed on a desktop printer or on a postage meter while using two print heads, or one print head and two passes, or a multicolor print head which uses different inks. Examples of the two inks to be used together are black ink with black fluorescent ink, red ink with red fluorescent ink, and blue ink with blue fluorescent ink. As used herein, the term color fluorescent ink is intended to include black fluorescent ink as well as other colors of fluorescent ink, such as red fluorescent ink and blue fluorescent ink.

One of the features of the present invention is to embed subliminal images by mixing the printed characters or bar codes pattern made from the non-fluorescent ink with messages, characters or bar codes pattern printed with the fluorescent ink. In the preferred embodiment, an imbedded black fluorescent image is located in black non-fluorescent text. Encoded messages can be changed on demand and new codes can be generated in real time.

One of the features of the present invention is that it provides additional levels of security with various levels of detection. For example, the present invention can be used with a first inspection level in normal daylight, and a second inspection level with an ultraviolet lamp for example, or a higher density of information can be imbedded and detected with special scanner and special software. The invention generally consists of printing composite black ink and black fluorescent ink images with a printer containing a multicolor cartridge. The images can be printed with any combination of monochrome non-fluorescent and fluorescent combinations allowing to embed more information; preferably proportional to the number of inks.

The fluorescent ink can be used to embed the covert information due to the fluorescent signal and, hence, to the possibility of discrimination from the environment by creating a negative crop contrast (fluorescent signal on absorbent background). The imbedded images can be printed dithered and widespread throughout the black printed background (Data matrix bar code in one example) in such a way that under an excitation radiation, when revealed, it will appear clearly without being obfuscated by the background. Additionally, in the covert mode, the two inks can be intermingled in a seamless way. In summary, the combination of non-fluorescent and fluorescent inks can be used in two modes; a covert mode (appearance of a regular black bar code) and a revealing mode (under excitation radiation, depending on the colorant from ultraviolet to infrared).

Referring now to FIG. 3, an enlarged view of the two dimensional bar code section 20 is shown. The bar code section 20 can also comprise features of the present invention. For example, Referring also to FIGS. 4 and 5, the bar code section 20 could be comprised of a first section 28 and a second section 30. The first and second sections 28, 30 are printed at the same locations on the mail piece to combine and form the overall bar code section 20. The first section 28 can be comprised of the first ink; a non-fluorescent ink. The second section 30 can be comprised of the second ink; a color fluorescent ink as described above. The first and second inks preferably comprise the same color under normal daylight conditions. Thus, when the first and second sections 28, 30 are printed with each other, the two sections 28, 30 are visually indistinguishable from each other under normal daylight.

The bar code section 20 can be read by an optical reader in the same manner as a conventional bar code section printed from a single ink source. However, when the bar code section 20 is subjected to a fluorescent exciting radiation source, the second section 30 can become optically distinguishable from the first section 28. The second section 30 can then be read or scanned as a machine readable code separate and apart from the first section 28. Thus, the bar code section 20 can be used to relay two different types of information; the information of the combined bar code section 20 and the information contained in the individual second section 30.

Although the present invention has been described with reference to the first and second sections comprising merely a single color, features of the present invention could be used in indicia which comprise more than one color ink. Referring also to FIG. 6, a printed indicium 32 could be provided with sections 34-45 comprised of more than one color. One or more of the sections 34-45 could be comprised of a color fluorescent ink. The pattern of the arrangement of the color fluorescent ink(s) could be used to convey information. In alternate embodiments, any suitable type of pattern or array of sections could be provided.

Figure 7:
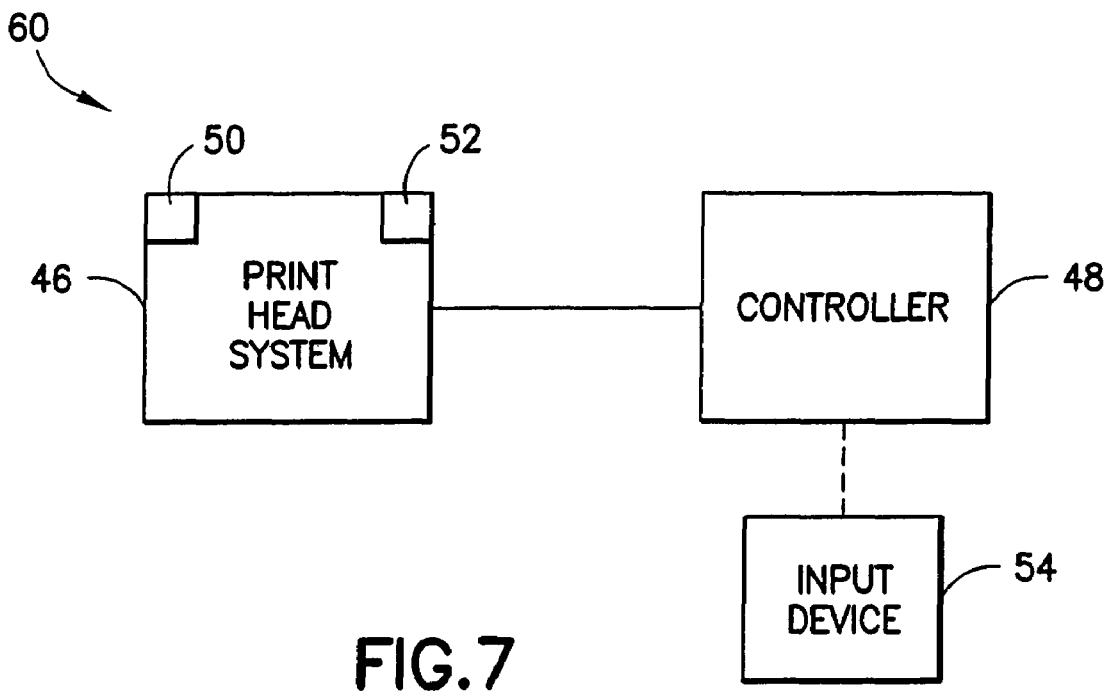
FIG. 7 is a diagrammatic view of a system for printing the composite indicium of the present invention.

Referring now to FIG. 7, there is shown a diagrammatic view of a system 60 for printing the indicium on an item, such as a mail piece for example. The system generally comprises a print head system 46 operably connected to a controller 48. The print head system 46 is adapted to print at least two different inks onto the item. The print head system comprises a first supply 50 of the first ink and a second supply 52 of the second different ink. As described above, the first ink comprises a non-fluorescent ink which has a first color under normal daylight, such as black, blue or red for example. Also was described above, the second ink comprises a color fluorescent ink which has a second color under normal daylight which is substantially the same as the first color, and which is at fluorescent when subjected to a fluorescent exciting radiation illumination source. In alternate embodiments, the print head system 46 could comprise more than the two inks supplies 50, 52. The print head system could comprise at least two print heads. In an alternate embodiment, the print head system could comprise a single print head adapted to pass by an area on the item at least two times, a first one of the times for printing the first ink and a second one of the times for printing the second ink.

The controller 48 is adapted for controlling application of the first and second inks by the print head system 46 on the item. In a preferred embodiment, the controller 48 is adapted to control the print head system 46 to print the first and second inks in at least partially intermixed patterns such that the patterns of the first and second inks are substantially visually indiscernible from each other in normal daylight. As explained above, the second pattern formed by printing with the second ink can be printed, at least partially, on top of the first pattern formed by printing with the first ink. Alternatively, the second pattern could be printed inside an open area of the first pattern, or could be printed adjacent one another. In one type of embodiment, the controller can be adapted to control printing by the print head system 46 to proportionally print the first and second inks based upon relative sizes of the first and second patterns. In one type of embodiment, the system can comprise an input device 54 which is coupled to the controller 48. The controller can be adapted to change the second pattern based upon a signal or signals from the input device 54. This allows the hidden encoded messages to be changed on demand by a user, or automatically, and new codes or new hidden encoded messages can be generated in real time.

Figure 8:
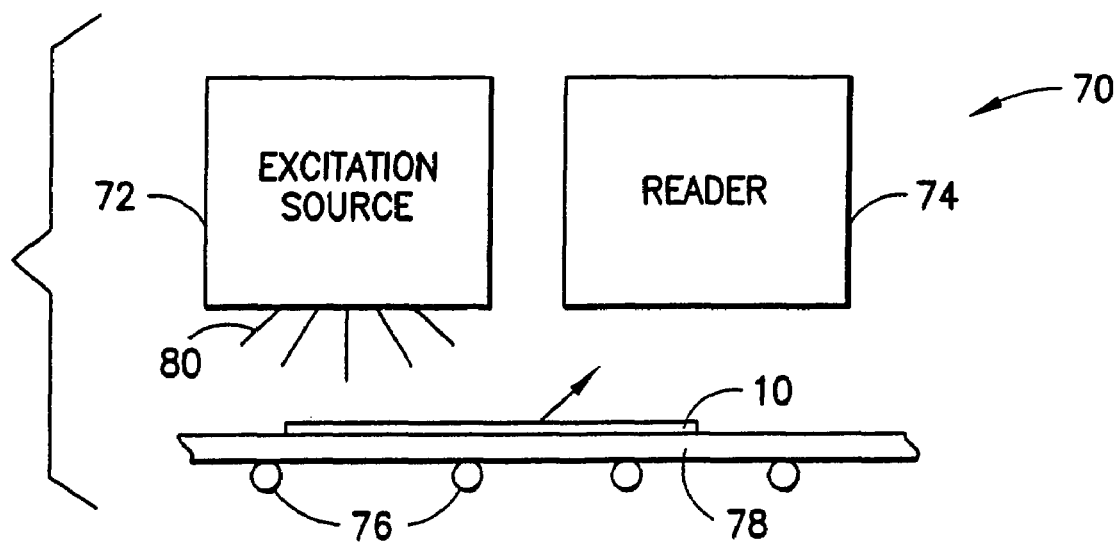
FIG. 8 is a diagrammatic view of a system for detecting a hidden fluorescent indicium in the composite indicium shown in FIG. 1.

Reading of the hidden indicium of the second section 26 in the composite indicium 10 can be done visually by a user under a fluorescence excitation source, and/or can be done with an automated system. Referring now also to FIG. 8, an automated system 70 for reading the hidden in addition in the composite indicium 10 is shown. The automated system 70 comprises an excitation source 72, a reader or scanner 74, and a transport system 76 for transporting an item 78 having the composite indicium 10. The transport system 76 could comprise any suitable type of document transport system, such as used in mail piece handling. In an alternate embodiment, the transport system 76 might not be provided, such as when the excitation source 72 and reader 74 are contained in a handheld scanning device. The excitation source 72 is adapted to direct excitation radiation 80 towards the composite indicium 10. The excitation source 72 and type of excitation radiation 80 will be dependent on the color fluorescent ink which is used; generally ranging from ultraviolet to infrared. The reader 74 is adapted to read the fluorescent image and send a signal corresponding to the fluorescent image to another component, such as a processor for processing the scanned fluorescent image. In alternate embodiments, any suitable type of device or method for subjecting the composite indicium to a fluorescent exciting radiation source and for automatically detecting the fluorescent image and sending a signal to another component corresponding to the fluorescent image could be provided.

Figure 9:
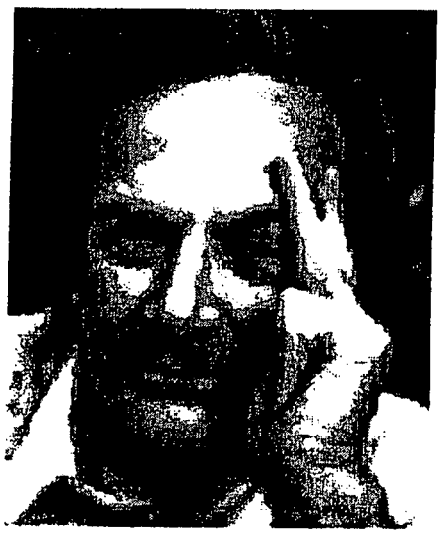
FIG. 9 is a plan view of an image incorporating features of the present invention.
Figure 11:
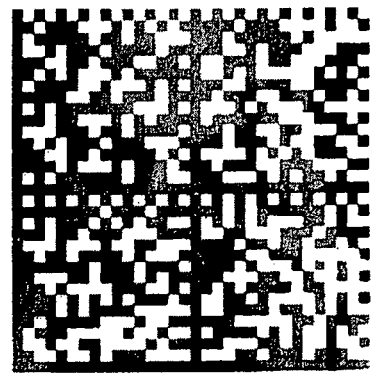
FIG. 11 is a plan view of a second section of the image shown in FIG. 9.
Figure 10:
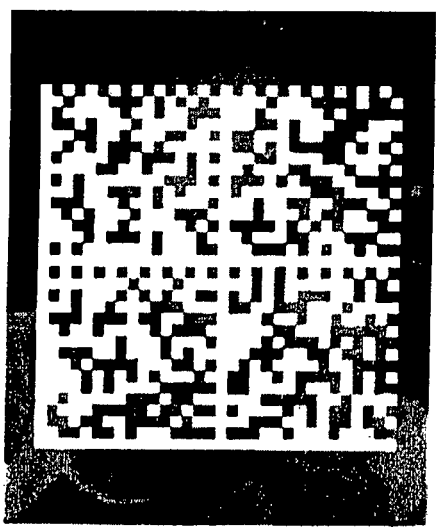
FIG. 10 is a plan view of a first section of the image shown in FIG. 9.

Referring now to FIGS. 9-13 an alternate embodiment of the present invention will be described. FIG. 9 shows a black and white photograph-type image 100 printed such as by halftoning or gray scaling, for example. Any suitable type of image printing method could be provided, including use of inkjet printing or dry ink toner printing. Features of the present invention could also be used when printing a color photograph-type image. The image 100 generally comprises a first section 102 (see FIG. 10) and a second section 104 (see FIG. 11). The first section 102 is printed with a first ink, such as non-fluorescent black ink. The second section 104 is printed with a second ink which comprises a fluorescent ink, such as black fluorescent ink. As can be seen in comparing FIGS. 9, 10 and 11, the first and second sections 102, 104 are printed in an intermixed or interleaved fashion to produce the complete image 100. Each section 102, 104 has a portion of the image 100. Both sections 102, 104 are printed in a photographic mode, such as with halftoning or gray scaling.

Figure 12:
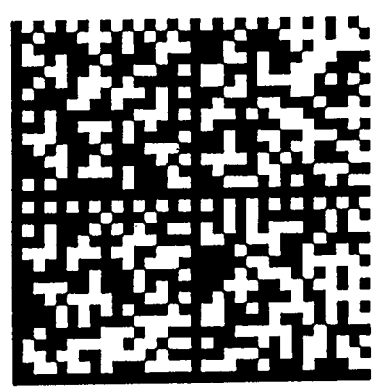
FIG. 12 is an illustrative view of the second section shown in FIG. 11 if the second section was not printed with halftoning or gray scaling.

Referring also to FIG. 12, the second section 104 is shown, for illustrative purposes only, as section 106 as if the section 104 was not printed with halftoning or gray scaling. The second section forms a Data Matrix two-dimensional bar code section. In alternate embodiments, the second section could comprise any suitable machine readable indicium, such as a one dimensional bar code section, for example. Various two-dimensional barcode formats exist, such as Data Matrix two-dimensional bar codes based on the AIM International Technical Specification—International Symbology Specification-marketed by AIM International, Inc; or PDF-417 symbology based on the Uniform Symbology Specification PDF-417 by AIM USA. An apparatus and method for printing two-dimensional bar codes is described in U.S. Pat. No. 6,631,012 B2 which is hereby incorporated by reference in its entirety. However, any suitable apparatus and method for printing the image 100 could be used.

Figure 13:
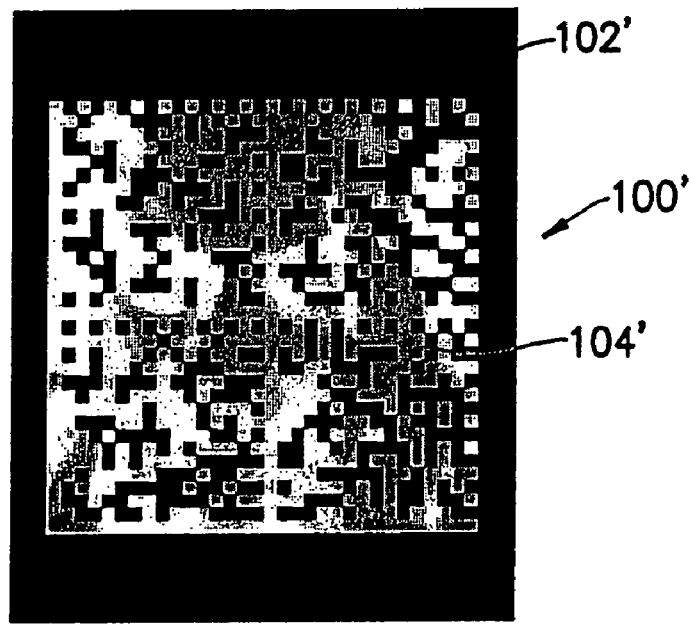
FIG. 13 is a view of the image shown in FIG. 9 when subjected to fluorescent-exciting radiation, and shown as an inverse or negative image.

Referring also to FIG. 13, the image 100 of FIG. 9 is shown when subjected to a fluorescence excitation radiation source, and shown as a negative or inverse image. As can be seen, the first section 102 becomes a black section 102' and the second section 104 becomes a substantially white/fluorescing section 104'. The section 104' can be read by a bar code reader while being fluoresced. One method for printing and reading is described in U.S. patent application Ser. No. 10/692,570, filed Oct. 24, 2003 entitled "Method And Apparatus For Halftone Printing With Multi-Signal Transmission Ink" (attorney docket No. F-756) which is hereby incorporated by reference in its entirety.

The present invention allows information to be hidden or covertly stored in any suitable type of image, including a photograph-type of image. The device which prints the image can be programmed to print the first section with the first ink and the second section with the second ink. For color images, the first ink could comprise three or more color inks and perhaps a black ink which do not comprise a fluorescent ink and the second ink could comprise three or more color inks and perhaps a black ink which comprise fluorescent inks.

Figure 14:
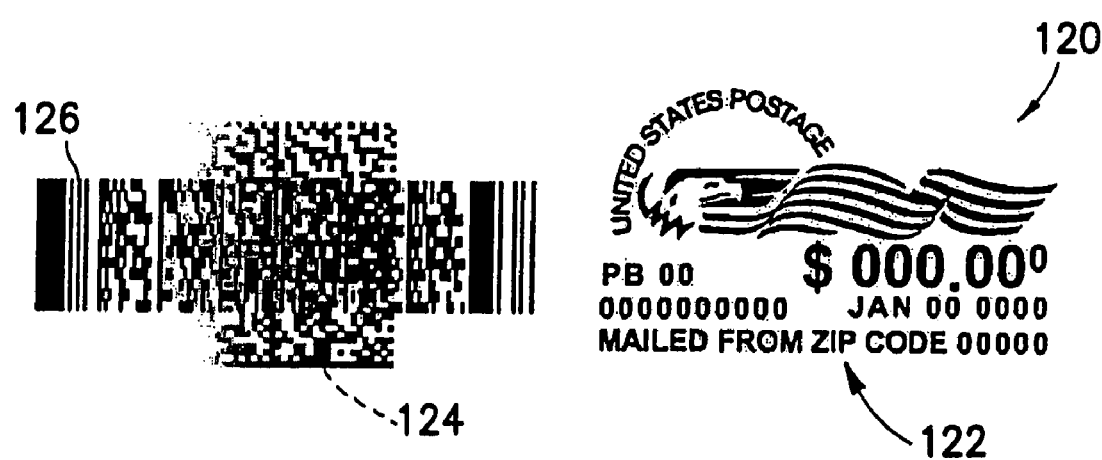
FIG. 14 is a plan view of shows a postage indicium with a first section and a second section incorporating features of the present invention.

Referring now to FIG. 14 another embodiment of the present invention is shown. FIG. 14 shows a postage indicium 120 with a first section 122 and a second section 124. The first section 122 is printed with a first ink, such as a non-fluorescent ink. The second section 124 is printed with a luminescent ink, such as a fluorescent ink. More specifically, the second ink comprises an ink which is substantially invisible or transparent in daylight or white light. In this embodiment, the second section 124 is printed over a bar code section 126 of the first section 122. The bar code section 126 is not substantially altered by the fact that the second section 124 is printed over the bar code section 126. Thus, the bar code section 126 can be read by a machine without interference from the fact that the second section 124 has been printed over the bar code section 126.

When the indicium 120 is subjected to a fluorescence excitation source, the second section 124 can fluoresce. The second section 124 can then be read by a machine or scanner. The second section 124 can be printed at a position relative to the bar code section 126 such that the bar code section 126 can be used as a reference for identifying a point for reading the second section 124. In an alternate embodiment, the bar code section 126 code be printed with a color fluorescent ink witch is adapted to fluoresce at a different wavelength than the ink used to print the second section 124.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for printing an indicium on an item, the system comprising:
   a print head system adapted to print at least two different inks onto the item, the print head system comprising a first supply of a first ink having a first color under normal daylight and a second supply of a second different ink, the second different ink having a second color under a normal daylight which is substantially the same as the first color, and wherein the second ink comprises a fluorescent ink; and
   a controller for controlling application of the first and second inks by the print head system on the item, wherein the controller is adapted to print the first and second inks in at least partially intermixed patterns such that the patterns of the first and second inks are substantially visually indiscernible within the indicium in normal daylight, and the second pattern of the second ink is discernible from the first pattern when subjected to fluorescent-exciting radiation.

2. A system for printing an indicium on an item as in claim 1 wherein the controller is adapted to print the first and second inks in at least partially intermixed patterns such that the patterns of the first and second inks are substantially visually indiscernible from each other in normal daylight.

3. A system for printing an indicium on an item as in claim 1 wherein the print head system comprises at least two print heads.

4. A system for printing an indicium on an item as in claim 1 wherein the print head system comprises a single print head adapted to pass by an area on the item at least two times, a first one of the times for printing the first ink and a second one of the times for printing the second ink.

5. A system for printing an indicium on an item as in claim 1 wherein the controller is adapted to print the second ink at least partially on top of the first ink.

6. A system for printing an indicium on an item as in claim 1 wherein the controller is adapted to proportionally print the first and second inks based upon relative sizes of the first and second patterns.

7. A system for printing an indicium on an item as in claim 1 wherein the controller is adapted to print the first and second inks in at least partially interlaced patterns.

8. A system for printing an indicium on an item as in claim 1 wherein the controller is adapted to change the second pattern based upon a signal from an input device.

9. A method of printing an indicium on an item comprising steps of:
  printing a first pattern on the item with a first non-fluorescent ink, the first ink having a first color under normal daylight; and
  printing a second pattern on the item at the first pattern with a second different ink, wherein the second different ink comprises a fluorescent ink having a substantially same color as the first ink under normal daylight, wherein the first and second patterns are substantially visually indiscernible within the indicium under normal daylight, and wherein the second pattern is discernible from the first pattern when subjected to a fluorescent-exciting illumination source.

10. A method as in claim 9 wherein the step of printing the second pattern comprises printing the second pattern relative to the first pattern such that the first and second patterns are substantially visually indiscernible from each other under normal daylight.

11. A method as in claim 9 wherein the step of printing the second pattern comprises printing the second pattern on top of the first pattern.

12. A method as in claim 9 wherein the step of printing the second pattern comprises at least partially interlacing portions of the second pattern with portions of the first pattern.

13. A method for detecting a printed indicium on an item comprising steps of:
  printing the indicium on the item as in claim 9;
  subjecting the indicium to the fluorescent-exciting illumination source; and
  scanning the first and second patterns as the second pattern is made fluorescent to thereby read the second pattern.

* * * * *